United States Patent
Lee et al.

(10) Patent No.: US 11,579,246 B2
(45) Date of Patent: Feb. 14, 2023

(54) RADAR APPARATUS, ANTENNA DEVICE FOR RADAR APPARATUS, AND CONTROL METHOD OF RADAR APPARATUS

(71) Applicant: MANDO CORPORATION, Pyeongtaek-si (KR)

(72) Inventors: Han Byul Lee, Seoul (KR); Jung Hwan Choi, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 531 days.

(21) Appl. No.: 16/715,710

(22) Filed: Dec. 16, 2019

(65) Prior Publication Data

US 2020/0292661 A1    Sep. 17, 2020

(30) Foreign Application Priority Data

Mar. 11, 2019 (KR) .................. 10-2019-0027276

(51) Int. Cl.
*G01S 7/03* (2006.01)
*H01Q 1/32* (2006.01)
*G01S 13/86* (2006.01)
*G01S 13/931* (2020.01)

(52) U.S. Cl.
CPC ............ *G01S 7/032* (2013.01); *G01S 13/867* (2013.01); *G01S 13/931* (2013.01); *H01Q 1/3233* (2013.01); *G01S 2013/93271* (2020.01)

(58) Field of Classification Search
CPC ................... G01S 7/032; G01S 13/931; G01S 2013/93271; H01Q 1/3233
See application file for complete search history.

(56) References Cited

U.S. PATENT DOCUMENTS

| | | | | |
|---|---|---|---|---|
| 6,580,385 B1* | 6/2003 | Winner | ................ | G01S 17/931 180/169 |
| 6,750,810 B2* | 6/2004 | Shinoda | ............... | H01Q 25/002 342/149 |
| 7,100,726 B2* | 9/2006 | Kim | ..................... | B60W 30/16 701/96 |
| 7,132,976 B2* | 11/2006 | Shinoda | ............... | G01S 13/931 342/75 |
| 7,173,561 B2* | 2/2007 | Isaji | ..................... | H04B 7/0604 342/107 |

(Continued)

FOREIGN PATENT DOCUMENTS

JP        2009-265007 A    11/2009
JP          5042558 B2      7/2012

*Primary Examiner* — Peter M Bythrow
(74) *Attorney, Agent, or Firm* — Morgan, Lewis & Bockius LLP

(57) ABSTRACT

A radar apparatus includes an antenna device including a first transmitting antenna, a second transmitting antenna, and a receiving antenna, a transceiver configured to transmit a transmission signal through one of the first transmitting antenna and the second transmitting antenna and receive a reflection signal reflected on an object through the receiving antenna, and a controller configured to process the reflection signal received through the receiving antenna to obtain information on the object, wherein the controller controls the transceiver to receive the reflection signal through the second transmitting antenna and the receiving antenna when the transmission signal is transmitted through the first transmitting antenna.

14 Claims, 11 Drawing Sheets

(56) References Cited

U.S. PATENT DOCUMENTS

| | | | | |
|---|---|---|---|---|
| 7,504,988 B2* | 3/2009 | Tsuchihashi | G01S 13/87 |
| | | | 342/158 |
| 8,009,082 B2* | 8/2011 | Shinoda | G01S 13/4463 |
| | | | 342/147 |
| 8,405,541 B2* | 3/2013 | Lee | G01S 13/0209 |
| | | | 342/128 |
| 8,717,224 B2* | 5/2014 | Jeong | H01Q 5/42 |
| | | | 342/93 |
| 8,902,103 B2* | 12/2014 | Kim | G01S 13/345 |
| | | | 342/134 |
| 10,371,796 B2* | 8/2019 | Kishigami | G01S 13/325 |
| 10,629,998 B2* | 4/2020 | Lim | G01S 13/931 |
| 10,775,491 B2* | 9/2020 | Lim | G01S 13/426 |
| 10,823,819 B2* | 11/2020 | Loesch | H01Q 21/065 |
| 10,823,836 B2* | 11/2020 | Wintermantel | G01S 13/42 |
| 10,890,652 B2* | 1/2021 | Kishigami | G01S 13/931 |
| 10,935,650 B2* | 3/2021 | Campbell | G01S 13/42 |
| 11,079,485 B2* | 8/2021 | Aoki | G01S 7/03 |
| 11,131,749 B2* | 9/2021 | Loesch | G01S 13/42 |
| 11,187,795 B2* | 11/2021 | Iwasa | H01Q 21/061 |
| 11,209,535 B2* | 12/2021 | Witter | G01S 13/584 |
| 2003/0112172 A1* | 6/2003 | Shinoda | G01S 13/4463 |
| | | | 342/149 |
| 2003/0164791 A1* | 9/2003 | Shinoda | H01Q 3/2605 |
| | | | 342/149 |
| 2007/0205938 A1* | 9/2007 | Zimmermann | G01S 13/87 |
| | | | 342/69 |
| 2007/0222662 A1* | 9/2007 | Toennesen | G01S 13/931 |
| | | | 342/27 |
| 2008/0303711 A1* | 12/2008 | Matsuoka | G01S 13/345 |
| | | | 342/196 |
| 2011/0074620 A1* | 3/2011 | Wintermantel | G01S 7/0233 |
| | | | 342/70 |
| 2011/0074621 A1* | 3/2011 | Wintermantel | H01Q 1/3233 |
| | | | 342/70 |
| 2013/0234880 A1* | 9/2013 | Lee | G01S 13/931 |
| | | | 342/70 |
| 2014/0104097 A1* | 4/2014 | Binzer | H01Q 3/30 |
| | | | 342/74 |
| 2016/0033632 A1* | 2/2016 | Searcy | G01S 13/424 |
| | | | 342/153 |
| 2016/0131742 A1* | 5/2016 | Schoor | G01S 13/931 |
| | | | 342/128 |
| 2017/0248692 A1* | 8/2017 | Zivkovic | G01S 13/42 |
| 2018/0149735 A1* | 5/2018 | Lim | G01S 13/931 |
| 2018/0294564 A1* | 10/2018 | Kim | H01Q 3/267 |

* cited by examiner

RADAR APPARATUS, ANTENNA DEVICE FOR RADAR APPARATUS, AND CONTROL METHOD OF RADAR APPARATUS

CROSS-REFERENCE TO RELATED APPLICATION(S)

This application is based on and claims priority under 35 U.S.C. § 119 to Korean Patent Application No. 10-2019-0027276, filed on Mar. 11, 2019, in the Korean Intellectual Property Office, the present disclosure of which is incorporated by reference herein in its entirety.

BACKGROUND

1. Field

The present disclosure relates to a radar apparatus included in a vehicle, an antenna device for the radar apparatus, and a method of controlling the radar apparatus.

2. Description of Related Art

A radar technology refers to a technology for detecting an object and obtaining information on the object by using a signal received by reflecting a signal transmitted from a transmitting antenna of a radar apparatus to the object. The radar technology is used in various apparatuses such as vehicles, aircrafts, military applications, and the like. Recently, the application range of the radar technology for the vehicles has gradually widened, and in particular, development of small vehicle radars is underway to be applied to driver assistance systems (ADAS).

The radar apparatuses applied to the vehicles must have angular resolution of a high resolution for accurate detection of a target. A conventional radar apparatus is configured with a structure in which several receiving antennas are arranged in order to obtain a high-resolution angular resolution. That is, the conventional radar apparatus uses a structure in which a plurality of receiving antenna channels are arranged to increase the angular resolution. Due to the structure of arranging multiple receiving antennas as described above, the size of the conventional radar apparatus is increased, and transceivers (i.e., RF circuitry) require a number of related elements.

In this regard, in the case of a multi-input multi-output (MIMO) radar, which is recently developing for miniaturization of the vehicle radar, an aperture of the receiving antennas may be extended by appropriately arranging the spacing of the transmitting antennas, thereby achieving the same performance while reducing the number of RF chips. However, the vehicle radar is required to sense a wide area at a short range as well as intermediate and long ranges, thereby increasing the cost and complexity.

That is, in addition to the high-resolution angular resolution, the vehicle radar apparatus also requires a low cost and a small size. In general, miniaturization of the radar apparatus may limit the number of antennas and may cause deterioration of the angular resolution performance.

Accordingly, there is a demand for the development of a radar apparatus capable of reducing the size while maintaining the high-resolution angular resolution.

SUMMARY

It is an aspect of the present disclosure to provide a radar apparatus, an antenna device for the radar apparatus, and a control method of the radar apparatus capable of improving angular resolution by extending an aperture of the receiving antenna by utilizing a transmitting antenna, which is not used according to a detection mode among transmitting antennas, as a receiving antenna.

It is another aspect of the present disclosure to provide a radar apparatus, an antenna device for the radar apparatus, and a control method of the radar apparatus capable of eliminating a ghost target due to a grating lobe by implementing a virtual antenna between a transmitting antenna utilized as a receiving antenna and a receiving antenna.

Additional aspects of the present disclosure will be set forth in part in the description which follows and, in part, will be obvious from the description, or may be learned by practice of the present disclosure.

In accordance with an aspect of the present disclosure, a radar apparatus includes an antenna device including a first transmitting antenna, a second transmitting antenna, and a receiving antenna, a transceiver configured to transmit a transmission signal through one of the first transmitting antenna and the second transmitting antenna and receive a reflection signal reflected on an object through the receiving antenna, and a controller configured to process the reflection signal received through the receiving antenna to obtain information on the object, wherein the controller is configured to control the transceiver to receive the reflection signal through the second transmitting antenna and the receiving antenna when the transmission signal is transmitted through the first transmitting antenna.

Each of the first transmitting antenna, the second transmitting antenna and the receiving antenna may comprise at least one channel, and each channel comprises at least one array antenna.

When the first transmitting antenna comprises a plurality of channels, at least one of the plurality of channels may be arranged to be space apart by a predetermined distance along a first direction perpendicular to the ground.

The second transmitting antenna may transmit the transmission signal or receive the reflection signal based on a control signal of the controller.

The receiving antenna may transmit the transmission signal through the first transmitting antenna in a long range detection mode and transmit the transmission signal through the second transmitting antenna in a short range detection mode.

The first transmitting antenna, the second transmitting antenna and the receiving antenna may be arranged to be sequentially space apart along a second direction horizontal to the ground.

The controller may determine the reflection signal by a virtual receiving antenna located between the second transmitting antenna and the receiving antenna.

When the transmission signal is transmitted through the first transmitting antenna, the controller may determine the reflection signal by the virtual receiving antenna based on the transmission signal and the reflection signal received through the second transmitting antenna and the receiving antenna and obtain information on the object based on the determined reflection signal.

The controller may provide information of the object to an advanced driver assistance systems (ADAS) included in a vehicle in which the radar apparatus is installed.

The advanced driver assistance systems may process image data captured by a camera disposed in the vehicle with detection data obtained by the radar apparatus. In accordance with another aspect of the present disclosure, an antenna device for use in a radar apparatus includes a first transmitting antenna configured to transmit a transmission signal in a long range detection mode, a second transmitting antenna configured to transmit a transmission signal in a short range detection mode, and a receiving antenna configured to receive a reflection signal reflected on an object, wherein the second transmitting antenna is configured to receive the reflection signal reflected on the object in the long range detection mode.

Each of the first transmitting antenna, the second transmitting antenna and the receiving antenna may comprise at least one channel, and each channel comprises at least one array antenna.

When the first transmitting antenna comprises a plurality of channels, at least one of the plurality of channels may be arranged to be space apart by a predetermined distance along a first direction perpendicular to the ground.

The first transmitting antenna, the second transmitting antenna and the receiving antenna may be arranged to be sequentially space apart along a second direction horizontal to the ground.

A virtual receiving antenna may be formed between the second transmitting antenna and the receiving antenna.

In accordance with another aspect of the present disclosure, a control method of a radar apparatus, which is provided with an antenna device including a first transmitting antenna, a second transmitting antenna and a receiving antenna, includes selecting one of a long range detection mode and a short long range detection mode, transmitting a transmission signal through the first transmitting antenna and receiving a reflection signal reflected on an object through the second transmitting antenna and the receiving antenna when the long range detection mode is selected, transmitting a transmission signal through the second transmitting antenna and receiving a reflection signal reflected on the object through the receiving antenna when the short range detection mode is selected, and obtaining information on the object by processing the reflection signal received in the long range detection mode or the reflection signal received in the short range detection mode.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
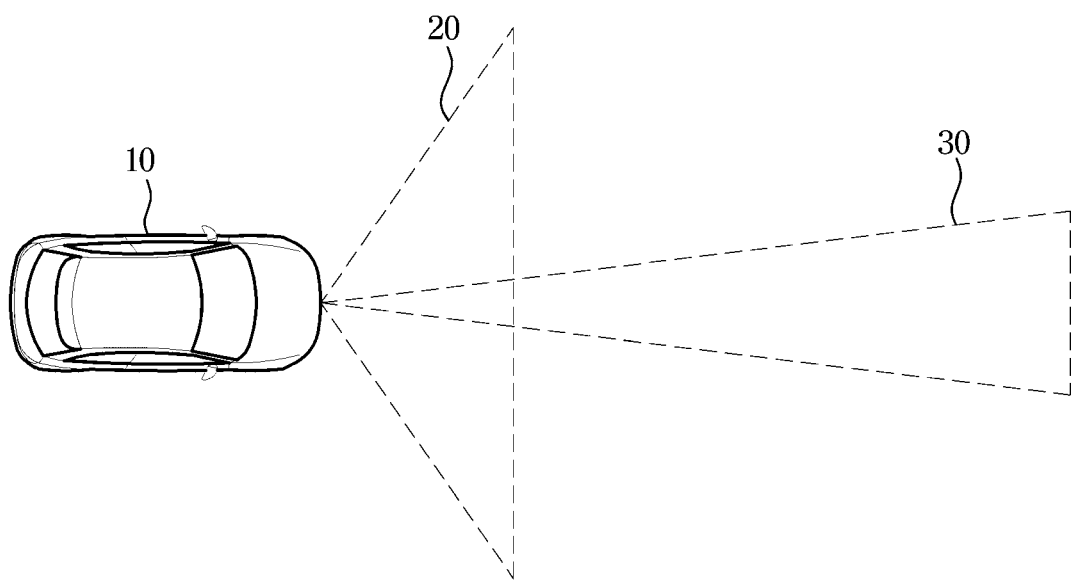
FIG. 1 is a view illustrating detection regions of a radar apparatus provided in a vehicle related to the present disclosure.

Hereinafter, embodiments of the present disclosure will be described in detail with reference to the accompanying drawings. Like reference numerals refer to like elements throughout this specification. This specification does not describe all components of the embodiments, and general contents in the technical field to which the present disclosure belongs or overlapping contents between the embodiments will not be described.

It will be understood that, although the terms first, second, A, B, (a), (b) etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. Throughout this specification, when a portion is connected to another portion, this includes the case in which the portion is indirectly connected to the other portion, as well as the case in which the portion is directly connected to the other portion, and the indirect connection includes a connection through a wireless communication network.

Unless otherwise defined, all terms used in the present disclosure (including technical and scientific terms) may be used in a sense that may be commonly understood by those skilled in the art to which the embodiments of the present disclosure belong. In addition, the terms defined in the commonly used dictionaries are not ideally or excessively interpreted unless they are specifically defined clearly.

The terms to be described below are terms defined in consideration of functions in the embodiments of the present disclosure, which may vary according to a user's or operator's intention or custom. Therefore, the definition should be made based on the contents throughout the present disclosure.

In the present disclosure, "first direction" refers to a direction perpendicular to the ground, and "second direction" refers to a direction horizontal to the ground perpendicular to the first direction. "Long range detection mode" refers to a detection mode of a radar apparatus for detecting an object located in an intermediate/long range from a vehicle. "Short range detection mode" refers to a detection mode of a radar apparatus for detecting an object located in a short range from a vehicle.

"Channel" refers to array antennas that are powered by one feeding line. In addition, the "information on an object" refers to the positional information or velocity information of the object detected in a detection region of a radar apparatus.

FIG. 1 is a view illustrating detection regions of a radar apparatus provided in a vehicle related to the present disclosure.

A vehicle radar apparatus may be mounted at various positions such as a front portion, a rear portion, or a side portion of a vehicle 10, and FIG. 1 illustrates an example in which the vehicle radar apparatus is mounted to the front portion. The radar apparatus for detecting the front of the vehicle 10 includes a long range antenna for detecting an object located in a long range and a short range antenna for detecting an object located in a short range together. A short range transmitting antenna is set to have a short range detection region 20 having a wide detection angle so as to detect an object in a short range. A long range transmitting antenna is set to have a long range detection region 30 having a narrow detection angle so as to detect an object in a long range.

The vehicle 10 may detect an object in the long range detection region 30 using an antenna for long range detection and may detect an object in the short range detection region 20 using an antenna for short range detection. The two detection regions are necessary because a situation in which the vehicle 10 requires both the detection of objects in the long range and the detection of objects in the short range occurs. For example, a long range antenna with a narrow and long detection range is required to overtake a vehicle ahead, and a short range antenna with a wide and short detection range is required to prevent collision with a pedestrian or another vehicle in close proximity.

Figure 2:
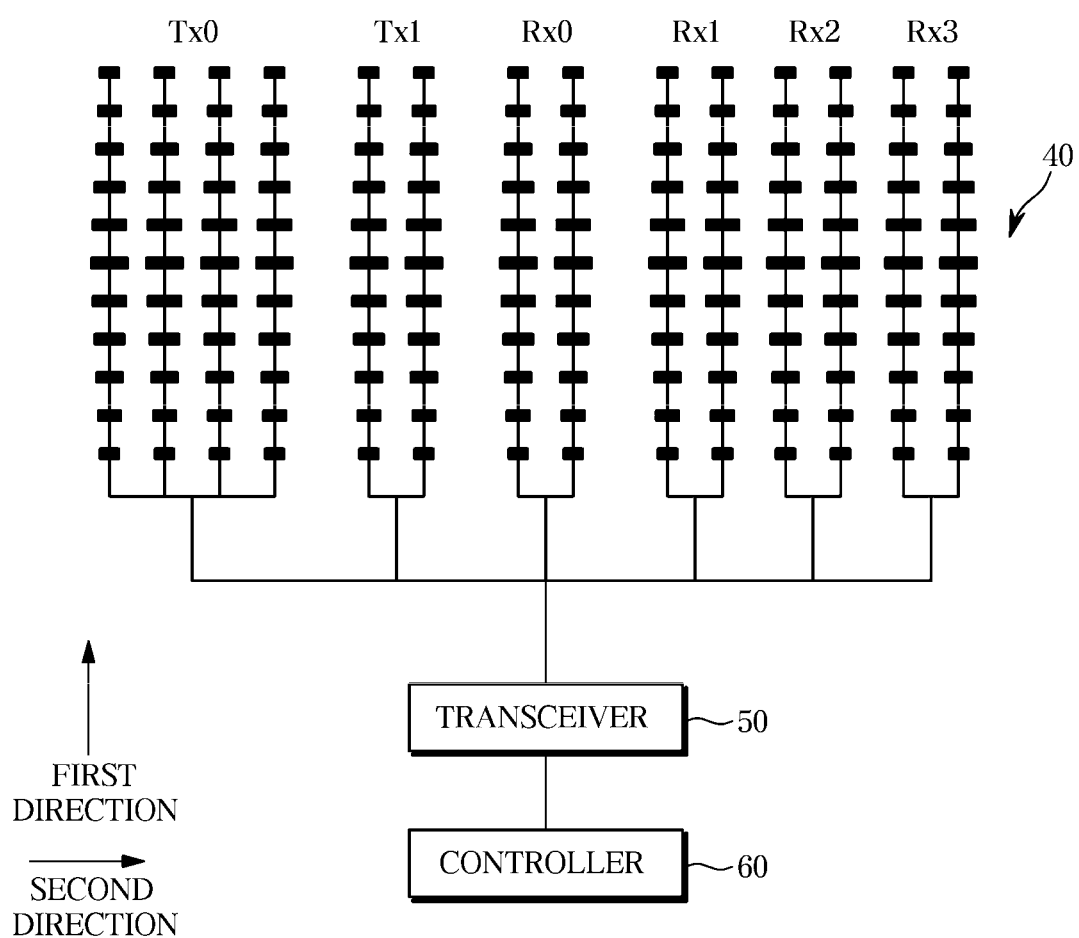
FIG. 2 is a diagram illustrating the vehicle radar apparatus for long and short range detections related to the present disclosure.

FIG. 2 is a diagram illustrating the vehicle radar apparatus for long and short range detections related to the present disclosure.

Referring to FIG. 2, an example of a radar apparatus including a long range antenna and a short range antenna is illustrated. An antenna device 40 of the radar apparatus includes a long range antenna and a short range antenna. The long range antenna includes a long range transmitting antenna Tx0 for outputting a long range transmission signal, and long range receiving antennas Rx1, Rx2, and Rx3 for receiving a reflection signal of the long range transmission signal. The short range antenna includes a short range transmitting antenna Tx1 for outputting a short range transmission signal and a short range receiving antenna Rx0 for receiving a reflection signal of the short range transmission signal.

The short range receiving antenna Rx0 and the long range receiving antennas Rx1, Rx2, and Rx3 may be shared. In this case, all of the four receiving antennas may receive the reflection signal of the long range transmission signal when detecting the long range and may receive the reflection signal of the short range transmission signal when detecting the short range.

In this case, the long range transmitting antenna and the long range receiving antennas, and the short range transmitting antenna and the short range receiving antenna are each composed of at least one patch antenna, and connecting two or more patch antennas in a first direction perpendicular to the ground in order to appropriately suppress the directionality of the antenna signal in the vertical direction is called an array antenna. FIG. 2 illustrates that each of the array antennas is composed of ten of the patch antennas, but this is only an example and the present disclosure is not limited thereto. The number, size and shape of the patch antennas included in each of the array antennas may be implemented differently as needed.

The radar apparatus includes a transceiver 50 for transmitting a transmission signal through the long range transmitting antenna and the short range transmitting antenna and receiving a reception signal from the long range receiving antenna and the short range receiving antenna. The transceiver 50 may include a switching device for selecting the transmitting antenna and the receiving antenna according to a detection mode.

The controller 60 may process the reflection signal received through the receiving antennas to obtain information on the objects in the detection regions. For example, the controller 60 may detect a signal for a target object through correlation analysis between a reflection signal received through the receiving antenna and a transmission signal transmitted through the transmitting antenna.

In order to appropriately suppress the directionality of the antenna signals in the horizontal direction, two or more of the array antennas may be arranged horizontally to the ground at equal spacing. In this case, it is assumed that the array antennas, which are powered by one feeding line, are connected to the same one channel. For example, referring to FIG. 2, four of the array antennas constitute the long range transmitting antenna Tx0 with one channel. In addition, two of the array antennas constitute the short range transmitting antenna Tx1 with one channel. In addition, two of the array antennas constitute the short range receiving antenna Rx0 with one channel. In addition, six of the array antennas each constitute two of the long range receiving antennas Rx1, Rx2, and Rx3 with three channels.

In order to improve the angular resolution in the horizontal direction, the left end and the right end of the antennas for reception need to be disposed far away in the entire channels. To this end, it is necessary to increase the number of channels of the antennas for reception or to widen the spacing of the array antennas sufficiently.

However, when the spacing of the array antennas is greater than a half-wave length ($\lambda/2$) used, the directionality of the antenna signals may be impaired. Therefore, it is necessary to efficiently adjust the number of the channels, the number of the array antennas, and the spacing of the array antennas.

Hereinafter the vehicle radar apparatus and a control method thereof according to embodiments of the present disclosure will be described with reference to the accompanying drawings.

Figure 3:
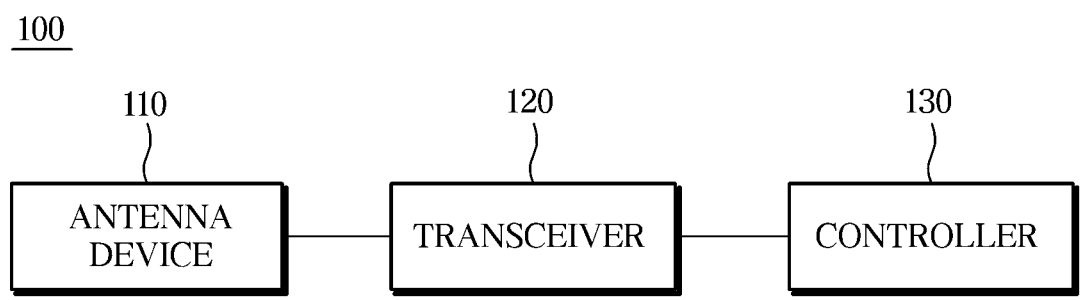
FIG. 3 is a block diagram of the vehicle radar apparatus according to an embodiment of the present disclosure.
Figure 4:
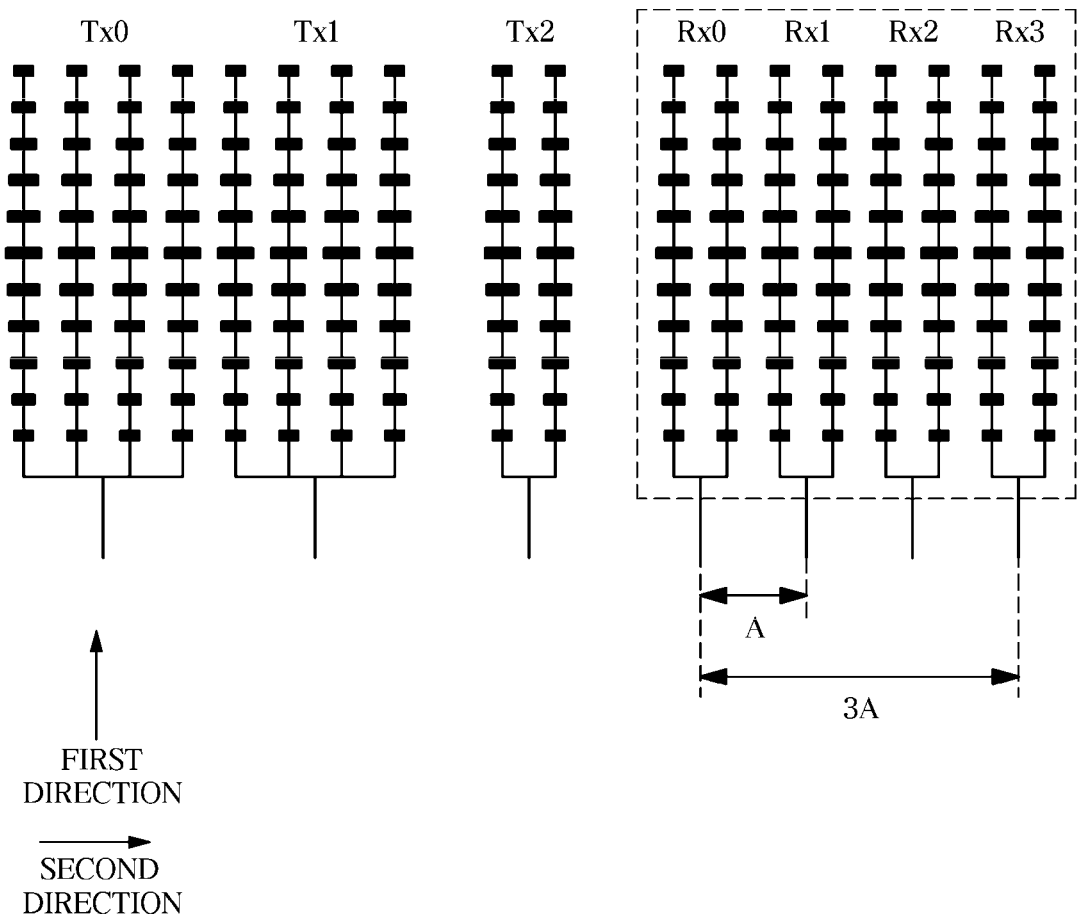
FIG. 4 is a diagram for explaining the structure of an antenna device provided in the vehicle radar apparatus according to an embodiment of the present disclosure.

FIG. 3 is a block diagram of the vehicle radar apparatus according to an embodiment of the present disclosure, and FIG. 4 is a diagram for explaining the structure of an antenna device provided in the vehicle radar apparatus according to an embodiment of the present disclosure.

Referring to FIG. 3, a vehicle radar apparatus 100 according to the present disclosure may include an antenna device 110 including a first transmitting antenna, a second transmitting antenna, and a receiving antenna, a transceiver 120 for transmitting a transmission signal through one of the first transmitting antenna and the second transmitting antenna according to the detection mode and receiving a reflection signal reflected from an object through the receiving antenna, and a controller 130 for processing the reflection signal received through the receiving antenna to obtain information on the object. This radar apparatus is also called a radar sensor.

The antenna device 110 may include the at least one first transmitting antenna, the at least one second transmitting antenna arranged to be spaced apart from the first transmitting antenna by a predetermined distance in a direction horizontal to the ground, and the one or more receiving antennas arranged to be spaced apart from each other by a predetermined distance successively.

As an example, as illustrated in FIG. 4, the first transmitting antennas are composed of two of the transmitting antennas Tx0 and Tx1, each of which has four of the array antennas, which extend in the first direction perpendicular to the ground, connected with one channel. Likewise, the second transmitting antenna is composed of one transmitting antenna Tx2 having two of the array antennas connected with one channel. The receiving antennas are composed of four of the receiving antennas Rx0, Rx1, Rx2, and Rx3, each of which has two of the array antennas connected with one channel.

That is, the radar apparatus according to an example may include three of the transmitting antennas and four of the receiving antennas. Hereinafter the radar apparatus will be described on the assumption of the above structure. However, the structure of such a radar apparatus is one example, and is not limited thereto. The radar apparatus according to the present disclosure may include the antenna device 110 composed of the L number of the first transmitting antennas, the M number of the second transmitting antennas, and the N number of the receiving antennas (L, M, and N are natural numbers). Each of the antennas may include at least one array antenna. Even in this case, the following description may be applied substantially the same.

Specific configurations and operations of the antenna device 110 will be described in more detail below with reference to the related drawings.

The transceiver 120 may include a transmitter configured to switch to any one of the first and second transmitting antennas included in the antenna device 110 to transmit a transmission signal through the switched transmitting antenna, and a receiver which receives a reflection signal reflected from an object that is a target in a detection region through the receiving antenna.

According to an example, the transmitter included in the transceiver 120 may include an oscillation portion for generating a transmission signal for one transmission channel allocated to the switched transmitting antenna or multiple transmission channels allocated to the plurality of transmitting antennas. For example, the oscillation portion may include a voltage-controlled oscillator (VCO), an oscillator, and the like.

According to an example, the receiver included in the transceiver 120 may include a low noise amplifier (LISA) for low noise amplifying a reflection signal received through four of the receiving antennas (i.e., four receiving channels), a mixer for mixing a low noise amplified reception signal, and amplifier for amplifying the mixed reception signal, an analog digital converter (ADC) for digitally converting an amplified reception signal to generate reception data, and the like.

More specifically, the transceiver 120 may transmit a transmission signal through the second transmitting antenna Tx2 in a short range detection mode for the short range detection and may receive reflection signals from all receiving antennas Rx0, Rx1, Rx2, and Rx3.

The transceiver 120 may transmit a transmission signal code-divided from the first transmitting antennas Tx0 and Tx1 in a long range detection mode for intermediate/long range detection and may receive reflection signals from all of the receiving antennas Rx0, Rx1, Rx2, and Rx3. In this case, according to an embodiment, the transceiver 120 may switch to use the second transmitting antenna Tx2 that is not used in the long range detection mode as a receiving antenna. That is, the transceiver 120 may receive a reflection signal through the second transmitting antenna Tx2 together with the receiving antennas Rx0, Rx1, Rx2, and Rx3 in the long range detection mode. The operation of the transceiver 120 may be controlled by the controller 130.

The controller 130 may process the transmission signal and the received reflection signal to calculate information on an object, for example, location information.

More specifically, in the short range detection mode, the controller 130 may obtain short range horizontal information such as an azimuth of the object located in the short range by using a transmission signal transmitted through the single second transmitting antenna Tx2 and a reception signal received from the receiving antennas Rx0, Rx1, Rx2, and Rx3. Referring to FIG. 4, when the spacing between receiving antennas is A, an aperture of the receiving antennas in the short range detection mode may be 3 A.

In the long range detection mode, the controller 130 may also obtain intermediate/long range horizontal information such as an azimuth angle of an object located in the intermediate/long range by using the transmission signal code-divided and transmitted from the first transmitting antennas Tx0 and Tx1 and the reflection signal received from the receiving antennas Rx0, Rx1, Rx2, and Rx3 and the second transmitting antenna Tx2. When transmitting a transmission signal through the first transmitting antennas Tx0 and Tx1, the controller 130 may control the transceiver 120 to receive the reflection signal through the second transmitting antenna Tx2 and the receiving antennas Rx0, Rx1, Rx2 and Rx3.

According to an example, when the first transmission antennas Tx0 and Tx1 are disposed to be spaced apart from each other in the first direction, the controller 130 may further obtain vertical information such as an elevation angle of the object.

According to an example, the controller 130 may be implemented to reduce cost and simultaneously reduce hardware size by efficiently distributing a signal processing requiring a large amount of computation to a first processor and a second processor.

The first processor included in the controller 130, which is a pre-processor for the second processor, may obtain transmission data and reception data, control generation of a transmission signal in the oscillation portion based on the obtained transmission data, synchronize the transmission data and the reception data, and frequency convert the transmission data and the reception data.

The first processor may perform frequency conversion after data buffering the obtained transmission data and the obtained reception data into a unit sample size that may be processed per period. A Fourier transform such as a fast Fourier transform (FFT) may be used for the frequency conversion performed by the first processor.

The second processor, which is a post-processor that performs an actual processing by using the processing result of the first processor, may perform a constant false alarm rate (CFAR) calculation, a tracking calculation, a target selection calculation on an object, etc. based on the received data frequency-converted by the first processor, and may extract angle information, speed information, distance information, etc. of the object.

The second processor may perform a second Fourier transform on a first Fourier transformed (FFT) signal made by the first processor, and the second Fourier transform may be, for example, a Discrete Fourier transform (DFT). The second Fourier transform may also be a chirp-discrete Fourier transform (Chirp-DFT) among the DFTs.

The second processor may obtain as many frequency values as the number corresponding to the length of the second Fourier transform through the second Fourier transform such as the Chirp-DFT, calculate a bit frequency having the largest power during each chirp period based on the obtained frequency value, and detect an object by obtaining velocity information and distance information of the object based on the calculated bit frequency.

Accordingly, a radar apparatus with improved angular resolution may be provided without additional configuration by extending the aperture of the receiving antenna utilizing the second transmitting antenna, which is not used while the radar apparatus is operating in the long range detection mode, as a receiving antenna.

Hereinafter a description of the improvement of the angular resolution through the expansion of the aperture of the receiving antenna of the radar apparatus 100 in the long range detection mode will be given in detail.

Figure 5:
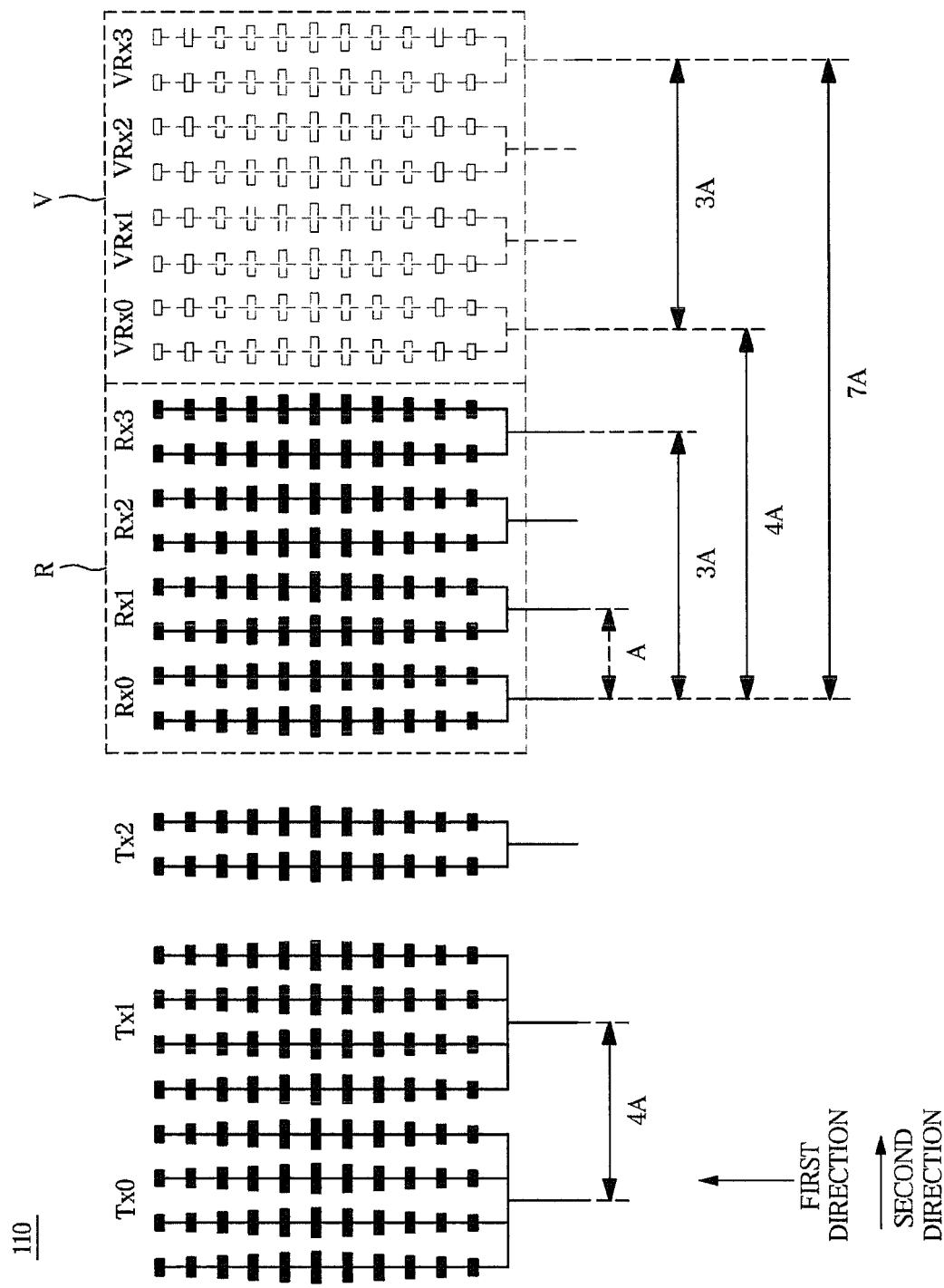
FIGS. 5 to 7 are diagrams for explaining the reception of a reflection signal using a second transmitting antenna in a long range detection mode according to an embodiment of the present disclosure.
Figure 6:
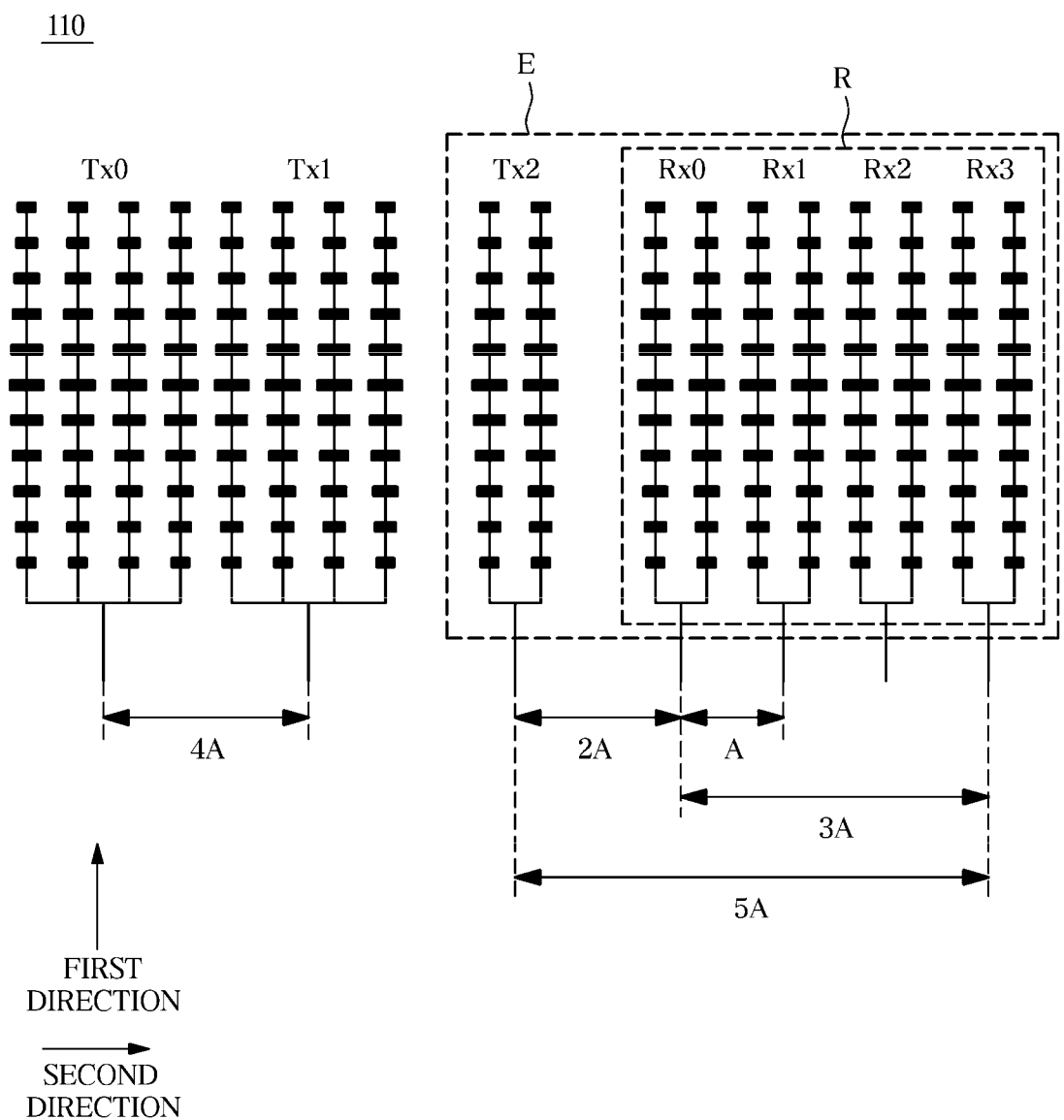
Figure 7:
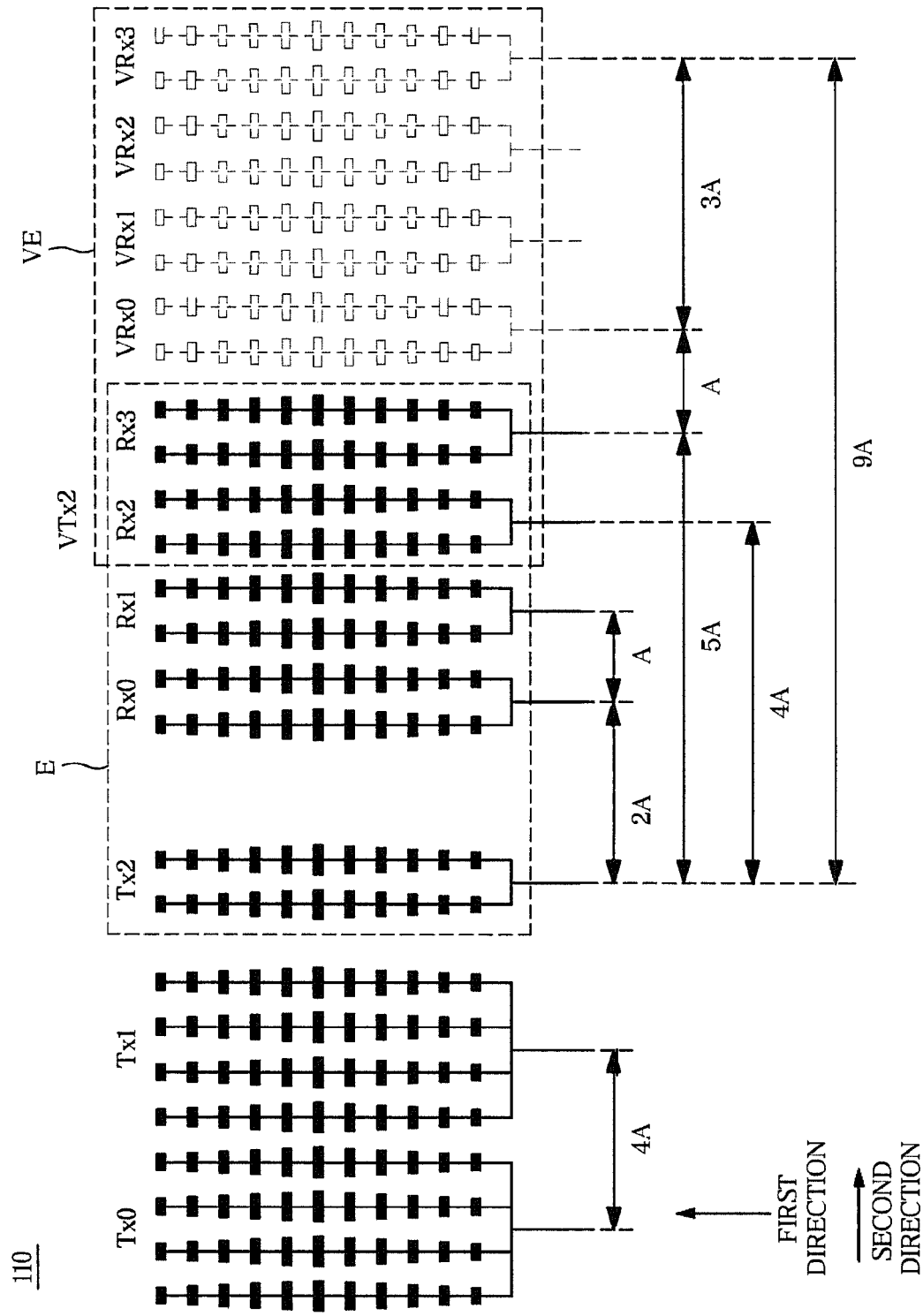

FIGS. 5 to 7 are diagrams for explaining the reception of a reflection signal using the second transmitting antenna in the long range detection mode according to an embodiment of the present disclosure.

Referring to FIG. 5, the first transmitting antennas Tx0 and Tx1, the second transmitting antenna Tx2, and the receiving antennas Rx0, Rx1, Rx2, and Rx3 may be arranged to be sequentially spaced apart from each other along a second direction horizontal to the ground. That is, in the antenna device 110, the first transmitting antennas Tx0 and Tx1 and the receiving antennas Rx0, Rx1, Rx2 and Rx3 may be disposed at opposite sides of the second transmitting antenna Tx2, respectively.

FIG. 5 illustrates that the first transmitting antennas Tx0 and Tx1 are arranged at the left side of the second transmitting antenna Tx2, but this is only an example, and the present disclosure is not limited thereto. That is, the first transmitting antennas Tx0 and Tx1 may be arranged at the right side of the second transmitting antenna Tx2, and the receiving antennas Rx0, Rx1, Rx2 and Rx3 may be arranged at the left side of the second transmitting antenna Tx2.

The radar apparatus 100 in the long range detection mode uses the plurality of transmitting antennas and the plurality of receiving antennas, and thus, may operate as a multi-input multi-output (MIMO) antenna device. First, in FIG. 5, the receiving antennas Rx0, Rx1, Rx2, and Rx3 will be described.

According to an example, it is assumed that each of the first transmitting antennas Tx0 and Tx1 through which the code-divided transmission signal is transmitted is arranged to be spaced apart by 4 A in a second direction horizontal to the ground. However, this is an example and the present disclosure is not limited thereto. The distance between the first transmitting antennas Tx0 and Tx1 may be set differently as necessary.

In this case, viewed from the position of the receiving antenna receiving the reflection signal reflected from an object, the reflection signal, which is a signal of the same form and divided into a first code and a second code, has the same effect as being spatially shifted and received by 4 A in the second direction. In this case, as a concept that is distinguished from the actual receiving antenna, a receiving antenna that exists virtually by horizontal separation of a transmitting antenna that simultaneously transmits a signal may be represented as a virtual receiving antenna.

Based on the first transmitting antenna Tx0 in FIG. 5, the receiving antennas Rx0, Rx1, Rx2, and Rx3 become real receiving antennas (Rx antennas) which exist actually. Based on the first transmitting antenna Tx0, because the first transmitting antenna Tx1 for transmitting the transmission signal of the second code at the same time is spaced apart by 4 A in the horizontal direction, the receiving antenna receiving the signal transmitted from the first transmitting antenna Tx1 has the same effect as being in the position shifted further by 4 A in the horizontal direction than the actual position. The receiving antenna generated at the position shifted as above may be represented as a virtual receiving antenna (virtual Rx antenna).

In order to distinguish the virtual receiving antennas from the actual receiving antennas, the virtual receiving antennas receiving the transmission signal of the first transmitting antenna Tx1 are represented as VRx0, VRx1, VRx2, and VRx3, and the actual receiving antennas are indicated by solids line and the virtual receiving antennas are indicated by dotted lines.

Accordingly, referring to FIG. 5, a total of four of the virtual receiving antennas VRx0, VRx1, VRx2, and VRx3 having the same arrangement as the real receiving antennas are generated at positions spaced apart from the real receiving antennas by 4 A. That is, in the long range detection mode, a region R in which the real receiving antennas Rx0, Rx1, Rx2, and Rx3 in four of the channels are arranged and a region V in which the virtual receiving antennas VRx0, VRx1, VRx2, and VRx3 in four of the channels are arranged may operate as a receiving antennas.

As a result, in the long range detection mode, the entire aperture of the receiving antennas becomes 7 A which is a horizontal distance between the leftmost receiving antenna Rx0 of the real receiving antennas and the rightmost receiving antenna VRx3 of the virtual receiving antennas. That is, through the MIMO method, the aperture of the receiving end may be extended from 3 A to 7 A.

Referring to FIG. 6, in the long range detection mode, the controller 130 may control the transceiver 120 to use the second transmitting antenna Tx2, which is used in the short range detection mode, as a receiving antenna. To this end, the second transmitting antenna Tx2 may be implemented to perform a transmission operation of a transmission signal for the short range detection and a reception operation of a reflection signal of the transmission signal for the long range detection. The second transmitting antenna Tx2 may perform one of transmission of the transmission signal and reception of the reflection signal according to the control of the controller 130.

In this case, the region in which the actual receiving antennas are arranged may extend to a region E including the second transmitting antenna Tx2 from the region R in which the real receiving antennas Rx0, Rx1, Rx2, and Rx3 in four of the channels are arranged. According to an example, it is assumed that the spacing between the second transmitting antenna Tx2 and the receiving antenna Rx0 is spaced apart by the horizontal distance 2 A. However, this is only an example, and the present disclosure is not limited thereto. The spacing between the second transmitting antenna Tx2 and the receiving antenna Rx0 may be set differently as necessary. In this case, the aperture of the region E in which the real receiving antennas are arranged is 5 A.

As described above with reference to FIG. 5, it is assumed that each of the first transmitting antennas Tx0 and Tx1 through which the code-divided transmission signal is transmitted is arranged to be spaced apart by 4 A in the second direction horizontal to the ground. In this case, viewed from the position of the receiving antenna receiving the reflection signal reflected from an object, the reflection signal, which is a signal of the same form and divided into the first code and the second code, has the same effect as being spatially shifted and received by 4 A in the second direction.

Accordingly, referring to FIG. 7, a total of five of the virtual receiving antennas VTx2, VRx0, VRx1, VRx2, and VRx3 having the same arrangement as the real receiving antennas are generated at positions spaced apart from the real receiving antennas Tx2, Rx0, Rx1, Rx2, and Rx3 by 4 A. In this case, the positions of the real receiving antenna Rx2 and a virtual the receiving antenna VTx2 overlap.

That is, in the long range detection mode, the region E in which the real receiving antennas Tx2, Rx0, Rx1 Rx2, and Rx3 in five of the channels are arranged and a region VE in which the virtual receiving antennas VTx2, VRx0, VRx1, VRx2, VRx3 in five of the channels are arranged may operate as a receiving antenna.

As a result, in the long range detection mode, the entire aperture of the receiving antennas becomes 9 A which is a horizontal distance between the leftmost second transmitting antenna Tx2 of the real receiving antennas and the rightmost receiving antenna VRx3 of the virtual receiving antennas. That is, through the MIMO method, the aperture of the receiving end may be extended 9 A by using the second transmitting antenna Tx2 as a receiving antenna.

Accordingly, in addition to miniaturization of the radar apparatus, angular resolution may be improved without additional configuration by extending the aperture of the receiving antenna utilizing the transmitting antenna, which is not used according to the detection mode among the transmitting antennas, as a receiving antenna.

Figure 8:
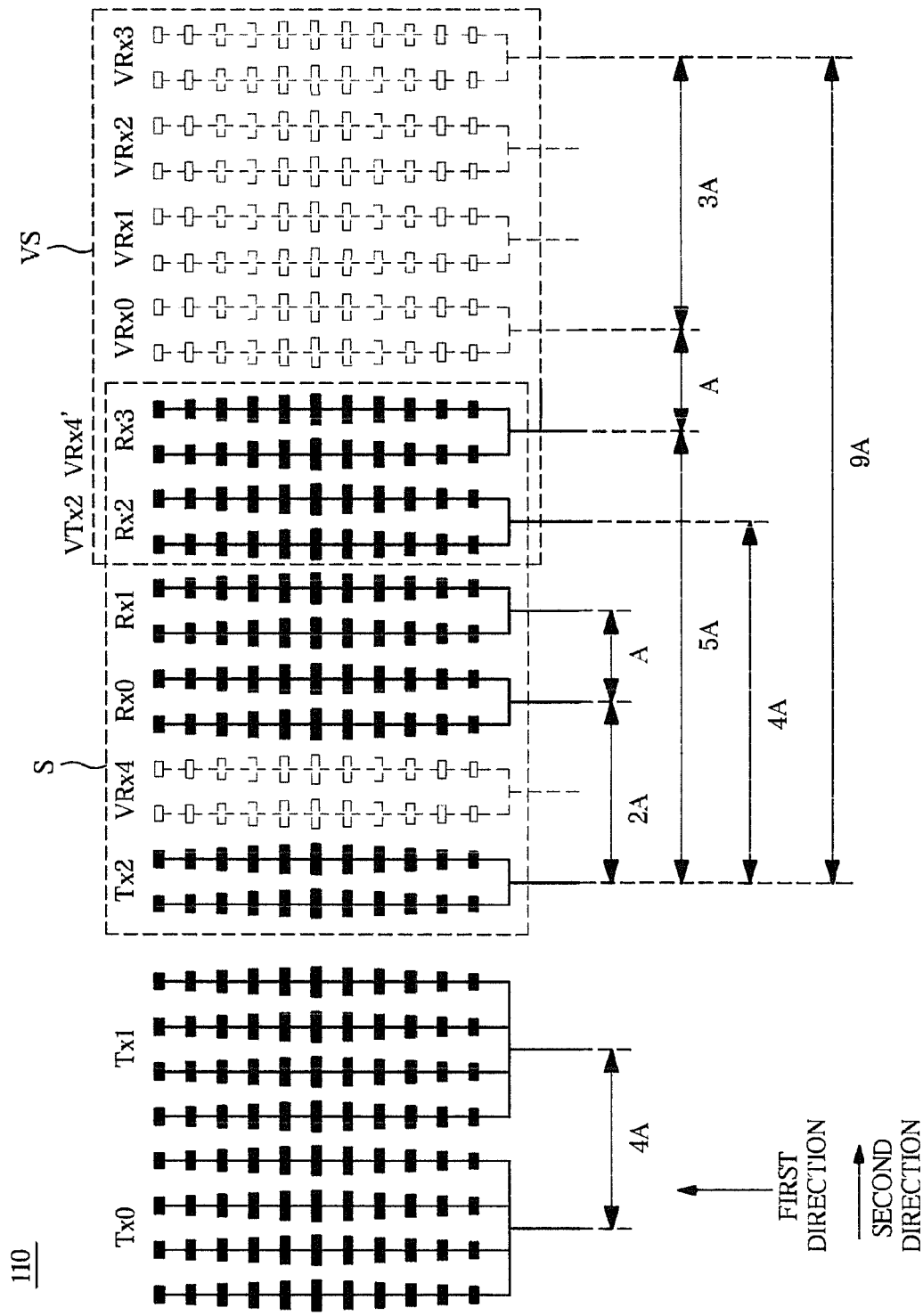
FIG. 8 is a diagram for explaining the calculation of a reflection signal by a virtual receiving antenna in the long range detection mode according to an embodiment of the present disclosure.

FIG. 8 is a diagram for explaining the calculation of a reflection signal by a virtual receiving antenna in the long range detection mode according to an embodiment of the present disclosure.

As described above with reference to FIG. 7, it is assumed that the distance between the second transmitting antenna Tx2 and the receiving antenna Rx0 in the region E in which the real receiving antennas Tx2, Rx0, Rx1, Rx2, and Rx3 in five of the channels are arranged is spaced apart by 2 A. If a horizontal distance A, which is the spacing between the receiving antennas, is set to the half-wave length of the transmission signal, the distance between the second transmitting antenna Tx2 and the receiving antenna Rx0 becomes longer than the half-wave length, so that two of different angular components occur that produce the same covariance matrix. This is expressed as spatial ambiguity obscuring the direction-of-arrival estimation of radio wave and may finally generate a ghost due to a grating lobe.

To prevent this, as shown in FIG. 8, the controller 130 may generate a virtual receiving antenna VRx4 positioned between the second transmitting antenna Tx2 and the receiving antenna Rx0. The virtual receiving antenna VRx4 may be arranged to be spaced apart from each of the second transmitting antenna Tx2 and the receiving antenna Rx0 by A.

However, this is based on the assumption that the spacing between the second transmitting antenna Tx2 and the receiving antenna Rx0 is 2 A, but is not limited thereto. For example, when the spacing between the second transmitting antenna Tx2 and the receiving antenna Rx0 is 3 A, two of the virtual receiving antennas spaced apart from each other by A may be arranged between the second transmitting antenna Tx2 and the receiving antenna Rx0.

That is, in the long range detection mode, a region S in which the real receiving antennas Tx2, Rx0, Rx1, Rx2, and Rx3 in five of the channels and the virtual receiving antenna VRx4 in one of the channel are arranged and the region VE in which the virtual receiving antenna VTx2, VRx0, VRx1, VRx2, and VRx3 in five of the channels are arranged may operate as a receiving antenna. Alternatively, the region S and a region VS in which the region S is shifted by 4 A may operate as a receiving antenna. In this case, the virtual receiving antenna VTx2 in the region VS and a virtual receiving antenna VRx4' in which the generated virtual receiving antenna VRx4 is shifted overlap with the real receiving antennas Rx2 and Rx3 in the region S. Therefore, the substantial apertures of the receiving ends in both cases are the same.

As a result, in the long range detection mode, the entire aperture of the receiving antennas becomes 9 A which is a horizontal distance between the leftmost transmitting antenna Tx2 of the real receiving antennas and the rightmost receiving antenna VRx3 of the virtual receiving antennas. In addition, ten of the receiving antennas in the entire aperture of the receiving ends may be all arranged at the horizontal distance A which is at an equal spacing.

The controller 130 may calculate the reflection signal received by the virtual receiving antenna VRx4. In this case, the controller 130 may calculate the reflection signal by the virtual receiving antenna VRx4 based on a transmission signal transmitted through the first transmitting antenna and a reflection signal received through the second transmitting antenna and the receiving antenna.

The controller 130 may obtain location information on an object according to correlation with the transmission signal based on the received reflection signal and the calculated reflection signal.

Accordingly, the ghost target due to the grating lobe, which may generate when the distance between the receiving antennas is greater than a half-wave length of the center frequency, may be eliminated by implementing a virtual antenna between the transmitting antenna utilized as a receiving antenna and the receiving antenna.

Figure 9:
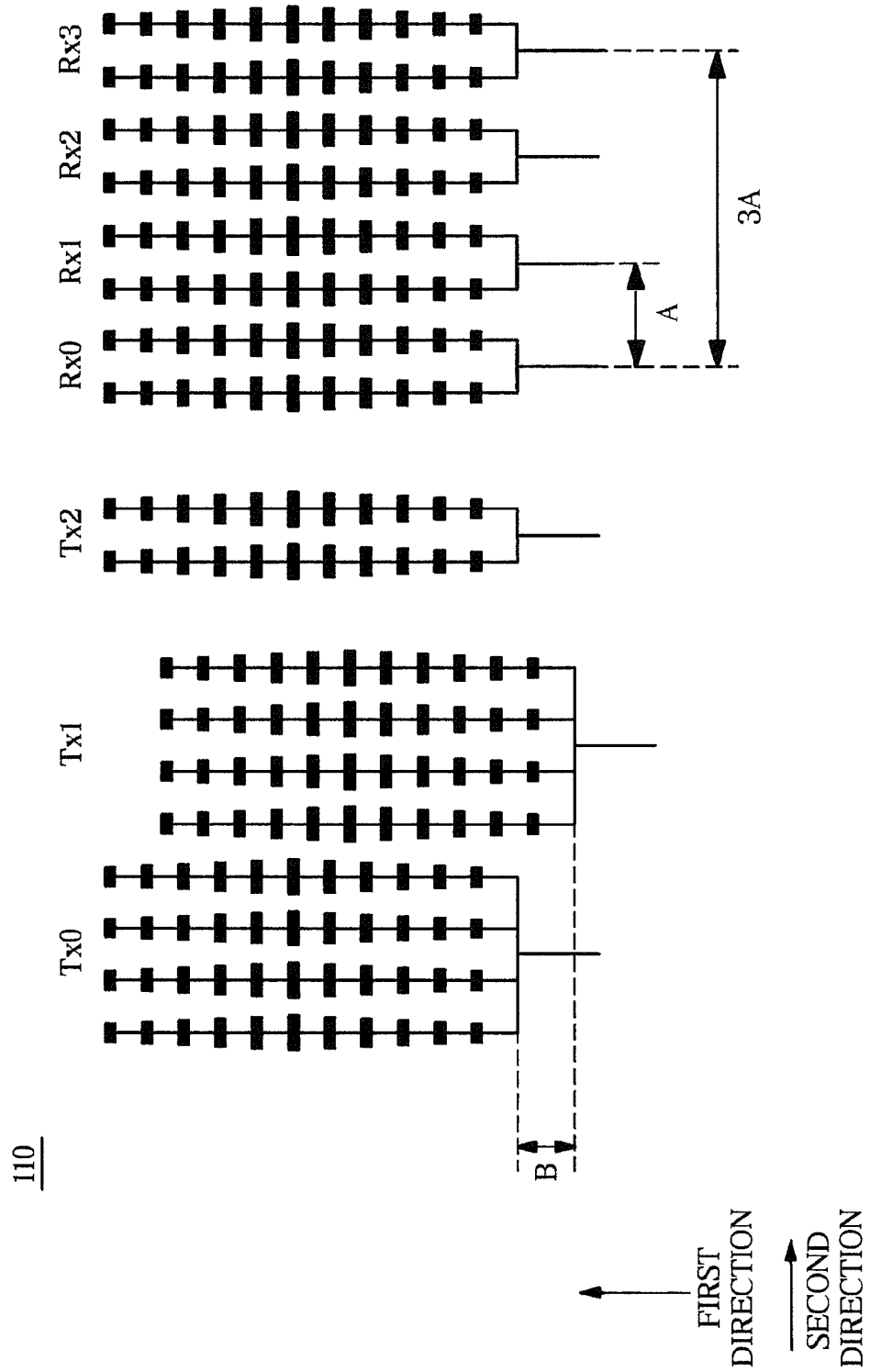
FIG. 9 is a diagram for explaining a structure in which some of first transmitting antennas are vertically spaced apart according to an embodiment of the present disclosure.

FIG. 9 is a diagram for explaining a structure in which some of the first transmitting antennas are vertically spaced apart according to an embodiment of the present disclosure.

According to an example, when the first transmitting antennas are composed of a plurality of channels, at least one of the plurality of channels may be disposed to be spaced apart by a predetermined distance along the first direction perpendicular to the ground. Referring to FIG. 9, because the first transmitting antennas Tx0 and Tx1 are composed of two of the channels, the first transmitting antenna Tx1 may be disposed to be lower than the first transmitting antenna Tx0 by a vertical distance B.

As such, by using vertical separation of the transmitting antennas, the controller 130 may further obtain vertical information such as an elevation angle of an object among the position information of the object by processing the transmission signal and the reception signal.

However, this is for obtaining the information in the vertical direction. In order to obtain the information in the horizontal direction perpendicular thereto, the above-described contents in FIGS. 3 to 8 may be substantially equally applied to the antenna device 110 having the structure illustrated in FIG. 9. Therefore, detailed description thereof will be omitted to avoid duplicate description.

Accordingly, even for a radar apparatus to which vertically spaced transmitting antennas are applied, the miniaturization of the radar apparatus and the improvement of the angular resolution may be realized together with the obtainment of the vertical information.

Figure 10:
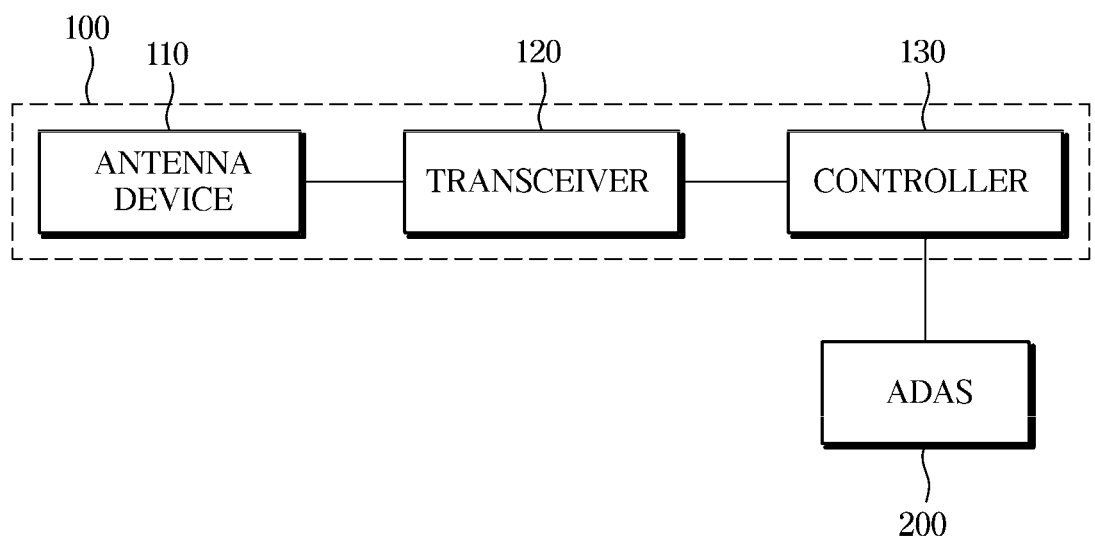
FIG. 10 is a block diagram for explaining provision of information on an object detected by the vehicle radar apparatus according to an embodiment of the present disclosure to a driver assistance system.

FIG. 10 is a block diagram for explaining provision of information on an object detected by the vehicle radar apparatus according to an embodiment of the present disclosure to a driver assistance system.

Referring to FIG. 10, the radar apparatus 100 may transmit and receive data to and from advanced driver assistance systems (ADAS) 200 provided in the vehicle. The controller 130 may provide information on an object to the advanced driver assistance systems 200 included in the vehicle in which the radar apparatus 100 is installed.

The advanced driver assistance systems may include at least one system selected from a group consisting of an autonomous driving system, a semi-autonomous driving system, an automated parking system, a blind spot detection system, a cross traffic alert system, a lane change and merge aid system, an automatic emergency braking system, a pedestrian detection system, a turn assist, and an intersection collision mitigation system. The terms and names of the advanced driver assistance systems described herein are disclosed by way of example and not limited thereto.

When receiving a request for detection data by the radar apparatus 100, the controller 130 may drive the radar apparatus 100 and control the radar apparatus 100 to transmit a transmission signal and to receive the reflection signal reflected from an object. The controller 130 may obtain information on the object based on the received reflection signal and transmit the information on the obtained object to the advanced driver assistance system that has requested the detection data.

According to an example, the advanced driver assistance system may further use image data captured by a camera provided in the vehicle. In this case, the captured image data may be used by fusion with the detection data detected by the radar apparatus 100.

According to an example, the controller 130 may be integrated into a domain control unit (DCU) that performs overall control of the vehicle. In this case, the controller 130 may be omitted from the radar apparatus or operate under the control of the domain control unit. The domain control unit may operate to process the received reflection signal to obtain information on an object and to control one or more of the advanced driver assistance systems based on the obtained information.

In addition, the driver assistance system may include autonomous driving module for autonomous driving. Alternatively, the domain control unit may control the vehicle to perform autonomous driving through control of individual system modules included in the advanced driver assistance system.

Accordingly, stability and convenience may be provided to the driver of the vehicle by providing information on the object detected by the radar apparatus to the advanced driver assistance system provided in the vehicle.

The antenna device according to an embodiment of the present disclosure, which is an antenna device used in the radar apparatus, includes the first transmitting antenna for transmitting a transmission signal in the long range detection mode, the second transmitting antenna for transmitting a transmission signal in the short range detection mode, and the receiving antenna for receiving a reflection signal reflected on an object, and the second transmitting antenna may receive the reflection signal reflected on the object in the long range detection mode. Each of the first transmitting antenna, the second transmitting antenna, and the receiving antenna may be composed of at least one channel, and each channel may include at least one array antenna.

The antenna device may be arranged such that the first transmitting antenna, the second transmitting antenna, and the receiving antenna are sequentially spaced along the second direction horizontal to the ground. In addition, when the antenna device operates in the long range detection mode, a virtual receiving antenna may be formed between the second transmitting antenna and the receiving antenna. When the first transmitting antenna is composed of a plurality of the channels, at least one of the plurality of channels may be arranged to be spaced apart by a predetermined distance in the first direction perpendicular to the ground.

Because the antenna device according to the present disclosure differs only in name from the antenna device included in the radar apparatus described above with reference to FIGS. 3 to 9 and is substantially the same in structure and operation as the antenna device included in the radar apparatus, further detailed description will be omitted to avoid duplicate description.

Accordingly, the radar apparatus may be miniaturized and the angular resolution may be improved by extending the aperture of the receiving antenna utilizing the transmitting antenna, which is not used according to the detection mode among the transmitting antennas, as a receiving antenna. In addition, the ghost target due to the grating lobe may be eliminated by implementing a virtual antenna between the transmitting antenna utilized as a receiving antenna and the receiving antenna.

The control method of the vehicle radar apparatus according to the present disclosure may be implemented in the radar apparatus 100 described above.

Hereinafter the control method of controlling the vehicle radar apparatus according to the present disclosure and the operation of the vehicle radar apparatus 100 for implementing the same will be described in detail with reference to the accompanying drawings.

Figure 11:
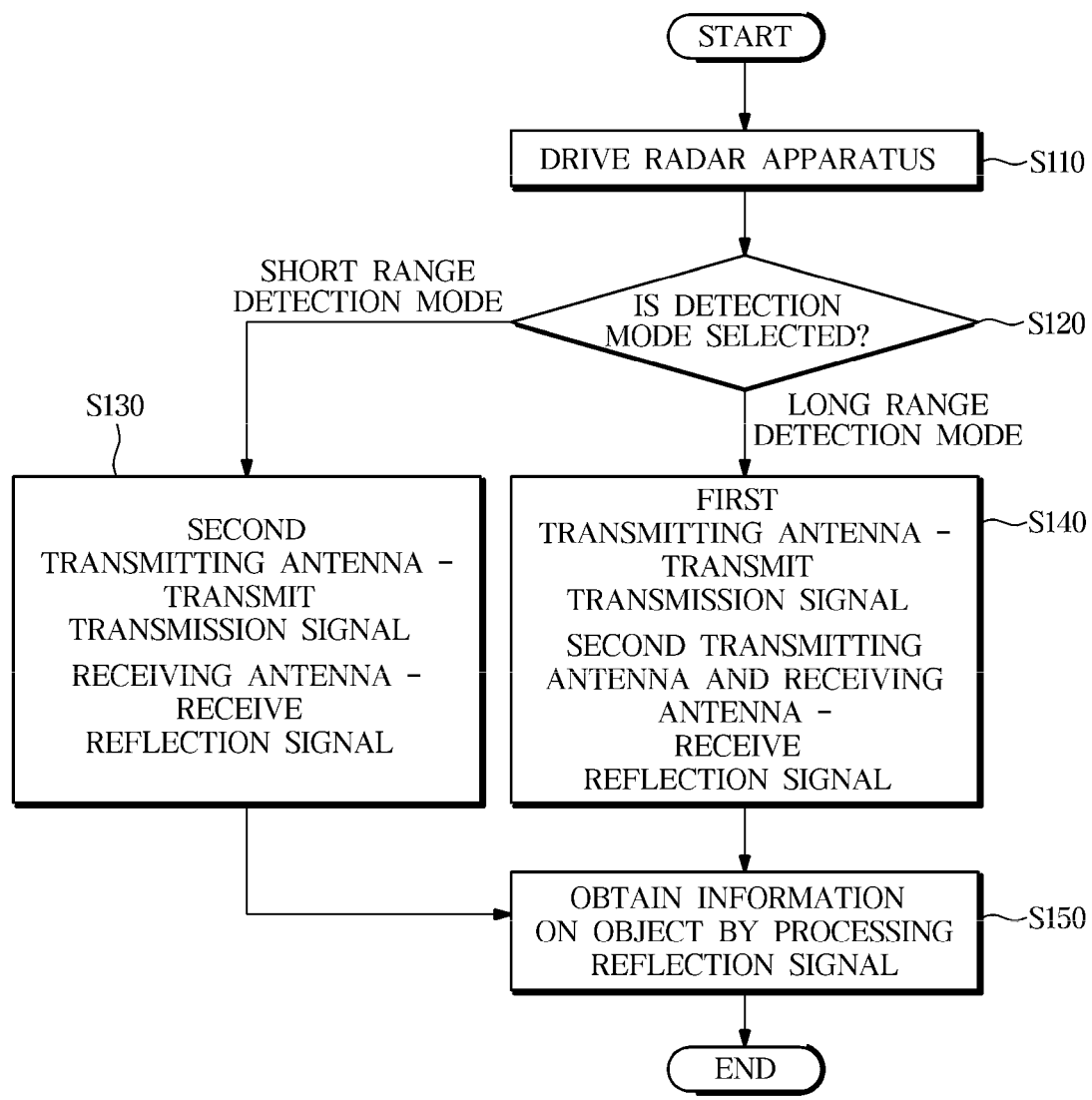
FIG. 11 is a flowchart illustrating a control method of the vehicle radar apparatus according to an embodiment of the present disclosure.

FIG. 11 is a flowchart illustrating a control method of the vehicle radar apparatus according to an embodiment of the present disclosure. The radar apparatus is provided with the antenna device including the first transmitting antenna, the second transmitting antenna, and the receiving antenna.

Referring to FIG. 11, when detection data by the radar apparatus is requested while the vehicle is driving, the radar apparatus may be driven [S110]. However, this is merely an example and the present invention is not limited thereto. The radar apparatus may be driven from the start of the vehicle.

The radar apparatus may select one of the long range detection mode and the short range detection mode according to a situation in which the detection data is requested [S120]. For example, when there is an attempt to overtake a vehicle ahead, the long range detection mode may be selected, Or, when the vehicle is parked, the short range detection mode having a wide detection range may be selected to prevent collision with a pedestrian or an object around the vehicle.

Referring back to FIG. 11, when the long range detection mode is selected, the radar apparatus may transmit a transmission signal through the first transmitting antenna and receive a reflection signal reflected on an object through the second transmitting antenna and the receiving antenna [S130].

The radar apparatus may include the at least one first transmitting antenna, the at least one second transmitting antenna arranged to be spaced apart from the first transmitting antenna by a predetermined distance in a direction horizontal to the ground, and the at least one receiving antenna arranged to be spaced apart by a predetermined distance consecutively in the same direction. As an example, as illustrated in FIG. 4, the radar apparatus may include the first transmitting antenna composed of two of the transmitting antennas Tx0 and Tx1, the second transmitting antenna composed of one of the transmitting antenna Tx2, and four of the receiving antennas Rx0, Rx1, Rx2, and Rx3. That is, the radar apparatus according to an embodiment may include three of the transmitting antennas and four of the receiving channel (the receiving antennas). Hereinafter a description will be given on the assumption of a radar apparatus having such a structure. However, the structure of such a radar apparatus is only an example, and the present disclosure is not limited thereto.

When the long range detection mode for intermediate/long range detection is selected, the radar apparatus may transmit a transmission signal code-divided from the first transmitting antennas Tx0 and Tx1 and may receive reflection signals from all of the receiving antennas Rx0, Rx1, Rx2, and Rx3. In this case, the radar apparatus may switch to use the second transmitting antenna Tx2 that is not used in the long range detection mode as a receiving antenna. That is, in the long range detection mode, a reflection signal may be received through the second transmitting antenna Tx2 together with the receiving antennas Rx0, Rx1, Rx2, and Rx3.

Referring back to FIG. 11, when the short range detection mode is selected, the radar apparatus may transmit a transmission signal through the second transmitting antenna Tx2 and receive a reflection signal reflected on an object through the receiving antenna [S140]. When the short range detection mode for the short range is selected, the radar apparatus may transmit a transmission signal through the second transmitting antenna Tx2 and receive reflection signals from all of the receiving antennas Rx0, Rx1, Rx2, and Rx3.

Referring back to FIG. 11, the radar apparatus may obtain information on the object by processing the reflection signal received in the long range detection mode or the reflection signal received in the short range detection mode [S150].

The radar apparatus may calculate information on the object, for example, location information, by processing the transmission signal and the received reflection signal. More specifically, in the short range detection mode, the radar apparatus may obtain short range horizontal information such as an azimuth of the object in the short range by using a transmission signal transmitted through the single second transmitting antenna Tx2 and a reception signal received from the receiving antennas Rx0, Rx1, Rx2, and Rx3.

In the long range detection mode, the radar apparatus may obtain intermediate/long range horizontal information such as an azimuth angle of an object located in the intermediate/long range by using the transmission signal code-divided and transmitted from the first transmitting antennas Tx0 and Tx1 and the reflection signal received from the receiving antennas Rx0, Rx1 Rx2, and Rx3 and the second transmitting antenna Tx2.

In addition, when each of the first transmission antennas Tx0 and Tx1 is arranged to be spaced apart from each other by a predetermined distance in the first direction, the radar apparatus may further obtain vertical information such as an elevation angle of the object.

When the antenna device operates in the long range detection mode, the radar apparatus may generate a virtual receiving antenna in a space between the second transmitting antenna Tx2 and the receiving antenna Rx0. In a case where the aperture of the receiving end is extended by using the second transmitting antenna as a receiving antenna, if the distance between the second transmitting antenna Tx2 and the receiving antenna Rx0 is longer than the half-wave length of the transmission signal, a ghost due to a grating lobe may be generated. In order to prevent this, the radar apparatus may form a virtual receiving antenna between the second transmitting antenna Tx2 and the receiving antenna Rx0 to adjust the spacing between the receiving antennas to less than the half-wave length.

Accordingly, the radar apparatus may be miniaturized and the angular resolution may be improved by extending the aperture of the receiving antenna utilizing the transmitting antenna, which is not used according to the detection mode among the transmitting antennas, as a receiving antenna. In addition, the ghost target due to the grating lobe may be eliminated by implementing a virtual antenna between the transmitting antenna utilized as a receiving antenna and the receiving antenna.

As is apparent from the above, a radar apparatus, an antenna device for the radar apparatus, and a control method of the radar apparatus according to the present disclosure can realize miniaturization of the radar apparatus and an improvement in angular resolution by extending the aperture of a receiving antenna utilizing a transmitting antenna, which is not used according to a detection mode among the transmitting antennas, as the receiving antenna.

Further, a radar apparatus, the antenna device for the radar apparatus, and the control method of the radar apparatus according to the present disclosure can eliminate a ghost target due to a grating lobe by implementing a virtual antenna between the transmitting antenna utilized as a receiving antenna and the receiving antenna.

The present disclosure described above may be implemented as computer readable codes on a medium in which a program is recorded. The computer-readable media include all kinds of recording devices in which data that may be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like, and also include those implemented in the form of carrier waves (e.g., transmission over the Internet).

The description above and the accompanying drawings are merely illustrative of the technical spirit of the present disclosure, and a person of ordinary skill in the art to which the present disclosure pertains will be able to make various modifications and variations such as combining, separating, substituting and changing the configurations without departing from the essential characteristics of the present disclosure. Accordingly, the disclosed embodiments are not intended to limit the technical spirit of the present disclosure but to describe the scope of the technical spirit of the present disclosure. That is, within the scope of the present disclosure, all of the components may be operated in a selective combination with one or more. The protection scope of the present disclosure should be interpreted by the following claims, and all technical ideas within the scope equivalent thereto shall be construed as being included in the scope of the present disclosure.

What is claimed is:

1. A radar apparatus comprising:
   an antenna device including a first transmitting antenna, a second transmitting antenna, and a receiving antenna;
   a transceiver configured to transmit a transmission signal through one of the first transmitting antenna and the second transmitting antenna and receive a reflection signal reflected on an object through the receiving antenna; and
   a controller configured to process the reflection signal received through the receiving antenna to obtain information on the object,
   wherein the controller is configured to control the transceiver to receive the reflection signal through the second transmitting antenna and the receiving antenna when the transmission signal is transmitted through the first transmitting antenna, and
   the first transmitting antenna, the second transmitting antenna and the receiving antenna are arranged in an order of the first transmitting antenna, the second transmitting antenna and the receiving antenna to be sequentially space apart along a second direction horizontal to the ground.

2. The radar apparatus according to claim 1, wherein each of the first transmitting antenna, the second transmitting antenna and the receiving antenna comprises at least one channel, and each channel comprises at least one array antenna.

3. The radar apparatus according to claim 2, wherein when the first transmitting antenna comprises a plurality of channels, at least one of the plurality of channels is arranged to be space apart by a predetermined distance along a first direction perpendicular to the ground.

4. The radar apparatus according to claim 1, wherein the second transmitting antenna is configured to transmit the transmission signal or receive the reflection signal based on a control signal of the controller.

5. The radar apparatus according to claim 1, wherein the transceiver is configured to transmit the transmission signal through the first transmitting antenna in a long range detection mode and transmit the transmission signal through the second transmitting antenna in a short range detection mode.

6. The radar apparatus according to claim 1, wherein the controller is configured to determine the reflection signal by a virtual receiving antenna located between the second transmitting antenna and the receiving antenna.

7. The radar apparatus according to claim 6, wherein when the transmission signal is transmitted through the first transmitting antenna, the controller is configured to determine the reflection signal by the virtual receiving antenna based on the transmission signal and the reflection signal received through the second transmitting antenna and the receiving antenna and obtain information on the object based on the determined reflection signal.

8. The radar apparatus according to claim 1, wherein the controller is configured to provide information of the object to an advanced driver assistance systems (ADAS) included in a vehicle in which the radar apparatus is installed.

9. The radar apparatus according to claim 8, wherein the advanced driver assistance systems is configured to process image data captured by a camera disposed in the vehicle with detection data obtained by the radar apparatus.

10. An antenna device for use in a radar apparatus, comprising:
a first transmitting antenna configured to transmit a transmission signal in a long range detection mode;
a second transmitting antenna configured to transmit a transmission signal in a short range detection mode; and
a receiving antenna configured to receive a reflection signal reflected on an object,
wherein the second transmitting antenna is configured to receive the reflection signal reflected on the object in the long range detection mode,
the first transmitting antenna, the second transmitting antenna and the receiving antenna are arranged in an order of the first transmitting antenna, the second transmitting antenna and the receiving antenna to be sequentially space apart along a second direction horizontal to the ground.

11. The antenna device according to claim 10, wherein each of the first transmitting antenna, the second transmitting antenna and the receiving antenna comprises at least one channel, and each channel comprises at least one array antenna.

12. The antenna device according to claim 11, wherein when the first transmitting antenna comprises a plurality of channels, at least one of the plurality of channels is arranged to be space apart by a predetermined distance along a first direction perpendicular to the ground.

13. The antenna device according to claim 10, wherein a virtual receiving antenna is formed between the second transmitting antenna and the receiving antenna.

14. A control method of a radar apparatus provided with an antenna device including a first transmitting antenna, a second transmitting antenna and a receiving antenna arranged in an order of the first transmitting antenna, the second transmitting antenna and the receiving antenna to be sequentially space apart from each other, comprising:
selecting one of a long range detection mode and a short long range detection mode;
transmitting a transmission signal through the first transmitting antenna and receiving a reflection signal reflected on an object through the second transmitting antenna and the receiving antenna, when the long range detection mode is selected;
transmitting a transmission signal through the second transmitting antenna and receiving a reflection signal reflected on the object through the receiving antenna, when the short range detection mode is selected; and
obtaining information on the object by processing the reflection signal received in the long range detection mode or the reflection signal received in the short range detection mode.

* * * * *